(12) United States Patent
Wang

(10) Patent No.: US 10,601,334 B1
(45) Date of Patent: Mar. 24, 2020

(54) FLYBACK SWITCHING POWER SUPPLY

(71) Applicant: MORNSUN GUANGZHOU SCIENCE & TECHNOLOGY CO., LTD., Guangdong (CN)

(72) Inventor: Baojun Wang, Guangdong (CN)

(73) Assignee: MORNSUN GUANGZHOU SCIENCE & TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/468,680

(22) PCT Filed: Feb. 2, 2018

(86) PCT No.: PCT/CN2018/075024
§ 371 (c)(1),
(2) Date: Jun. 12, 2019

(87) PCT Pub. No.: WO2018/161749
PCT Pub. Date: Sep. 13, 2018

(30) Foreign Application Priority Data

Mar. 10, 2017 (CN) .......................... 2017 1 0142831

(51) Int. Cl.
*H02M 3/335* (2006.01)
*H02M 1/44* (2007.01)

(52) U.S. Cl.
CPC ......... *H02M 3/33592* (2013.01); *H02M 1/44* (2013.01); *H02M 3/33523* (2013.01); *H02M 3/33576* (2013.01)

(58) Field of Classification Search
CPC ......... H02M 3/33523; H02M 3/33569; H02M 3/33576; H02M 3/33592

(Continued)

(56) References Cited

U.S. PATENT DOCUMENTS

| 4,618,919 A | 10/1986 | Martin, Jr. | |
|---|---|---|---|
| 2007/0242487 A1* | 10/2007 | Orr | H02M 3/335 363/21.12 |

(Continued)

FOREIGN PATENT DOCUMENTS

| CN | 1728517 | 2/2006 |
|---|---|---|
| CN | 102570861 | 7/2012 |

(Continued)

OTHER PUBLICATIONS

"International Search Report (Form PCT/ISA/210) of PCT/CN2018/075024," dated May 2, 2018, pp. 1-3.

*Primary Examiner* — Gary A Nash
(74) *Attorney, Agent, or Firm* — JCIP Global Inc.

(57) ABSTRACT

A flyback switch power supply connects $N_{P1}$ heteronymous terminals in a transformer B to a power source, grounds second primary side winding $N_{P2}$ heteronymous ends, and ensures that $N_{P1}$ and $N_{P2}$ are dual-wire parallel windings. Adding a capacitor C1, one end of C1 is connected to $N_{P1}$ homonymous terminals, and the other end is connected to $N_{P2}$ homonymous terminals. The secondary side winding uses a Q2 connection method that is the opposite to the prior art, and is controlled by a PWM signal controlled by another output voltage. The following effect is realized: when Q1 is connected, $N_{P1}$ and $N_{P2}$ are both excited, and there is artificial surplus energy; when Q1 is disconnected, the secondary side $N_S$ implements a rectified output voltage via Q2 on the basis of the output load requirements, and the leakage inductance and excess energy are non-destructively absorbed by $N_{P2}$ via D1.

20 Claims, 4 Drawing Sheets

(58) Field of Classification Search
USPC .................... 363/21.12, 21.14, 21.16, 21.18
See application file for complete search history.

(56) References Cited

U.S. PATENT DOCUMENTS

| | | | | |
|---|---|---|---|---|
| 2008/0272115 A1* | 11/2008 | Suenaga | ........... | H02M 3/33569 |
| | | | | 219/702 |
| 2009/0091952 A1* | 4/2009 | Yoshida | ................ | H02M 1/15 |
| | | | | 363/21.12 |
| 2014/0362613 A1* | 12/2014 | Park | ...................... | H02M 1/34 |
| | | | | 363/21.16 |

FOREIGN PATENT DOCUMENTS

| CN | 106849670 | 6/2017 |
|---|---|---|
| JP | H08168244 | 6/1996 |

* cited by examiner

FLYBACK SWITCHING POWER SUPPLY

CROSS-REFERENCE TO RELATED APPLICATION

This application is a 371 application of an international PCT application serial no. PCT/CN2018/075024, filed on Feb. 2, 2018, which claims priority to and the benefit of China Patent Application No. CN201710142831.6, filed on Mar. 10, 2017, the disclosures of which are incorporated herein by reference in its entirety.

TECHNICAL FIELD

The present invention relates to the field of switching power supplies, and in particular, to a flyback switching power supply.

BACKGROUND ART

At present, switching power supplies have been extensively used. For applications with input power below 75 W and having no requirement on power factor (PF), flyback switching power supplies may have fascinating advantages: a simple circuit topology and a wide input voltage range. Since the number of components is small, the reliability of the circuit is relatively high, and the flyback switching power supply is widely used. For convenience, in many documents, the flyback switching power supply is also referred to as a flyback switching power supply, a flyback power supply, and a flyback converter. In Japan and Taiwan, it is also referred to as a flyback converter, a flyback switching power supply, and a flyback power supply. A common topology for AC/DC converters is shown in FIG. 0. The prototype of the figure is from page 60 of *Topology and Design of Switching Power Supply Power Converters* with the book No. ISBN978-7-5083-9015-4 written by Dr. Zhang Xingzhu. It consists of a rectifier bridge 101, a filter circuit 200, and a basic flyback topology unit circuit 300, wherein 300 is also referred to as a main power stage. A practical circuit is also provided with pressure-sensitive, NTC thermistor, and electromagnetic interference (EMI), and other protection circuits in front of the rectifier bridge, to ensure that the electromagnetic compatibility of the flyback switching power supply meets a use requirement. In the flyback switching power supply, a minimum leakage inductance between primary-side and secondary-side windings is required, so that conversion efficiency is high. In addition, a withstand voltage carried by a primary-side main power switch transistor is also reduced. For the flyback switching power supply that uses an RCD network for demagnetization and absorption, losses of the RCD are also reduced. Note: RCD absorption refers to an absorption circuit consisting of a resistor, a capacitor, and a diode. The literature in China is the same as the international one. The letter R is usually used to number of the resistor and represent the resistor. The letter C is used to number the capacitor and represent the capacitor. The letter D is used to number the diode and represent the diode. The resistor and the capacitor are connected in parallel, and then connected in series with to diode to form an RCD network.

When there is no rectifier bridge 101, 200 and 300 can constitute a DC/DC switching power supply or converter. Because it is supplied by DC, there is no requirement for the power factor, and the power may be more than 75 W. In fact, the use of flyback topology in low-voltage DC/DC switching power supplies is not mainstream. This is because the input current is discontinuous and the ripple is relatively large, which has a relatively high requirement for a previous power supply device. The output current is also discontinuous, and the ripple is large, which has a relatively high requirement for capacity of a subsequent filter capacitor. Especially when the input voltage is relatively low, since the excitation current becomes large, the primary-side winding has to be bifilar-wound with a plurality of strands to reduce the loss of the skin effect. The inductance of the primary-side winding is also relatively low, and it is often found that the calculated number of turns is insufficient for winding full a wire casing of a skeleton from left to right in a tiled manner. When a working voltage is relatively high, the primary-side winding may adopt the sandwich series connection scheme. At a low working voltage, the series connection causes the inductance to be excessively large, and the sandwich parallel connection scheme has to be used. Because the two primary-side windings are not in the same layer, there is leakage inductance between the two primary-side windings. Consequently, losses are generated, which makes the efficiency of the switching power supply become low, causing the following problems:

During excitation, due to the leakage inductance, the induced voltage difference has a voltage difference in the leakage inductance, causing non-negligible loss and it might be easier to understand in the following manner: for two primary-side windings that are connected in parallel, if the difference between the numbers of turns is one, it is equivalent to that inter-turn short-circuit of this turn exists, but the short-circuit is formed by using DC internal resistance of the two primary-side windings that are connected in parallel. Relatively, the loss is not as large as that of a real inter-turn short-circuit. During demagnetization, that is, the rectifier diode of the secondary side is conducted, and the output filter capacitor is continuously charged. In this case, the primary side induces a reflected voltage, and the two primary-side windings that are connected in parallel induce voltages that are not equal. Due to low internal resistance of the winding, it is induced that current caused by the voltages that are not equal is not small, causing losses and relatively large electromagnet interference. If a third winding is used for demagnetization, which of the two primary-side windings that are connected in parallel are bifilar-wound with the third winding?Only two third windings can be used, which are respectively bifilar-wound with the two primary-side windings that are connected in parallel, and then are connected in parallel to form a "third winding". The process is complicated, and the third winding formed by parallel connection by two windings also induces voltages that are not equal, causing losses and large electromagnetic interference. In fact, for the common demagnetization by the third winding, the advantage is non-destructive demagnetization, and the efficiency is relatively high, but the choice of the wire diameter of the third winding is also a problem: a relatively small wire diameter is selected, and parallel winding with the primary-side winding is relatively troublesome, and the thin wire is easily pulled apart. If a wire diameter the same as that of the primary-side winding is selected, costs are high. The third winding demagnetizes the flyback switching power supply is also referred to as "the three-winding absorbs the flyback switching power supply".

The flyback switching power supply still has one shortcoming: the bandwidth of the switching power supply is insufficient, that is, the loop response is poor. For a common switching power supply with a working frequency of 65 KHz, the bandwidth thereof is usually only a few hundred Hz, usually below 400 Hz. To achieve 1 KHz, design engineers need superb design experience, superb circuit board design level, and superb debugging skills. For a switching power supply with a working frequency of 280 to 330 kHz, the bandwidth thereof is usually only 1 to 2 KHz. It is also very difficult to achieve 10 kHz. This is determined by the inherent working characteristics of the flyback switching power supply. An optocoupler detects a voltage change on an output end, to determine the duty cycle of the primary side for the following implementation: after considering the efficiency loss, in the unit time, the energy of the primary-side excitation is equal to the energy output by the secondary side in the same period. However, as the jump frequency of the load increases, a control loop of the system cannot keep synchronization. This is also an important reason why for a flyback switching power supply, such as a printer or an automatic door, is rarely seen in low-voltage DC/DC switching power supplies on occasions where a requirement is made on the bandwidth.

Two primary-side windings that are connected in parallel are applied to low-voltage DC/DC switching power supplies. Low-voltage DC/DC switching power supplies usually refer to switching power supplies with input voltages below 48V. Low-voltage DC/DC switching power supplies of some uses can work up to DC 160V, such as railway power supplies.

SUMMARY OF THE INVENTION

In view of this, to overcome the deficiencies of the existing low-voltage flyback switching power supply, the present invention provides a flyback switching power supply. The primary-side winding may be used without parallel connection between two separate primary-side windings. That is, leakage inductance between primary and secondary-side windings is allowed to be relatively large, and a third winding is not used for demagnetization. Moreover, the conversion efficiency is not reduced, the losses during excitation and demagnetization are reduced, the bandwidth is increased, and the loop response is good.

The objective of the present invention is achieved in the following manner: a flyback switching power supply, comprising: a transformer, a first switch transistor, a second switch transistor, wherein the first and second switch transistors are both N-channel field-effect transistors, a second capacitor, and a first diode, wherein the transformer comprises a first primary-side winding, a second primary-side winding, and a secondary-side winding, an undotted terminal of the secondary-side winding is connected to a drain of the second switch transistor, a source of the second switch transistor is connected to one end of the second capacitor; to form a positive output, and a dotted terminal of the secondary-side winding is connected to the other end of the second capacitor to form a negative output; a positive terminal of an input DC power supply is connected to both a dotted terminal of the first primary-side winding and a cathode of the first diode, and an undotted terminal of the first primary-side winding is connected to a drain of the first switch transistor; an anode of the first diode is connected to an undotted terminal of the second primary-side winding, a source of the first switch transistor is connected to a dotted terminal of the second primary-side winding, and a connection point is also connected to a negative terminal of the input DC power supply; a gate of the first switch transistor is connected to a primary-side control signal; characterized in that, the first primary-side winding and the second primary-side winding are bifilar-wound, and a first capacitor is further comprised; one end of the first capacitor is connected to the undotted terminal of the first primary-side winding, and the other end of the first capacitor is connected to the undotted terminal of the second primary-side winding, and a gate of the second switch transistor is connected to a secondary-side control signal.

Preferably, the secondary-side control signal is a PWM signal controlled by a voltage between the positive output and the negative output.

The present invention further provides a solution equivalent to solution 1, and the equivalent solution is solution 2: the objective of the present invention may be further achieved in the following manner: a flyback switching power supply, comprising: a transformer, a first switch transistor, a second switch transistor, wherein the first and second switch transistors are both N-channel field-effect transistors, a second capacitor, and a first diode, wherein the transformer comprises a first primary-side winding, a second primary-side winding, and a secondary-side winding, an undotted terminal of the secondary-side winding is connected to a drain of the second switch transistor, a source of the second switch transistor is connected to one end of the second capacitor to form a positive output, and a dotted terminal of the secondary-side winding is connected to the other end of the second capacitor to form a negative output; a positive terminal of an input DC power supply is connected to both a drain of the first switch transistor and the undotted terminal of the second primary-side winding, and a source of the first switch transistor is connected to a dotted terminal of the first primary-side winding; the dotted terminal of the second primary-side winding is connected to a cathode of the first diode, an undotted terminal of the first primary-side winding is connected to an anode of the first diode, and a connection point is also connected to a negative terminal of the input DC power supply; a gate of the first switch transistor is connected to a primary-side control signal; characterized in that, the first primary-side winding and the second primary-side winding are bifilar-wound, and a first capacitor is further comprised; one end of the first capacitor is connected to the dotted terminal of the first primary-side winding, and the other end of the first capacitor is connected to the dotted terminal of the second primary-side winding, and a gate of the second switch transistor is connected to a secondary-side control signal.

Preferably, the secondary-side control signal is a PWM signal controlled by a voltage between the positive output and the negative output.

The present invention further provides a technical solution of using a P-channel field-effect transistor as a first switch transistor. Based on the solution 1, polarities of the power supply, the diode, and the dotted terminal need to be reversed, and the polarity of an output rectifier portion does not need to be reserved. Then solution 3 is obtained: a flyback switching power supply, comprising: a transformer, a first switch transistor, a second switch transistor, wherein the first switch transistor is a P-channel field-effect transistor and the second switch transistor is an N-channel field-effect transistor, a second capacitor, and a first diode, wherein the transformer comprises a first primary-side winding, a second primary-side winding, and a secondary-side winding, an undotted terminal of the secondary-side winding is connected to a drain of the second switch transistor, a source of the second switch transistor is connected to one end of the second capacitor to form a positive output, and a dotted terminal of the secondary-side winding is connected to the other end of the second capacitor to form a negative output; a negative terminal of an input DC power supply is connected to both an undotted terminal of the first primary-side winding and an anode of the first diode, and a dotted terminal of the first primary-side winding is connected to a drain of the first switch transistor; a cathode of the first diode is connected to the dotted terminal of the second primary-side winding, a source of the first switch transistor is connected to the undotted terminal of the second primary-side winding, and a connection point is also connected to a positive terminal of the input DC power supply; a gate of the first switch transistor is connected to a primary-side control signal; characterized in that, the first primary-side winding and the second primary-side winding are bifilar-wound, and a first capacitor is further comprised; one end of the first capacitor is connected to the dotted terminal of the first primary-side winding, and the other end of the first capacitor is connected to the dotted terminal of the second primary-side winding, and a gate of the second switch transistor is connected to a secondary-side control signal.

Preferably, the secondary-side control signal is a PWM signal controlled by a voltage between the positive output and the negative output.

The present invention further provides a solution equivalent to solution 3, and the equivalent solution is a technical solution of using a P-channel field-effect transistor as a first switch transistor of solution 2. Based on the solution 2, polarities of the power supply, the diode, and the dotted terminal need to be reversed, and the polarity of an output rectifier portion does not need to be reserved. Then solution 4 is obtained: the objective of the present invention may be further achieved in the following manner: a flyback switching power supply, comprising: a transformer, a first switch transistor, a second switch transistor, wherein the first switch transistor is a P-channel field-effect transistor and the second switch transistor is an N-channel field-effect transistor, a second capacitor, and a first diode, wherein the transformer comprises a first primary-side winding, a second primary-side winding, and a secondary-side winding, an undotted terminal of the secondary-side winding is connected to a drain of the second switch transistor, a source of the second switch transistor is connected to one end of the second capacitor to form a positive output, and a dotted terminal of the secondary-side winding is connected to the other end of the second capacitor to form a negative output; a negative terminal of an input DC power supply is connected to both a drain of the first switch transistor and the dotted terminal of the second primary-side winding, and a source of the first switch transistor is connected to an undotted terminal of the first primary-side winding; the undotted terminal of the second primary-side winding is connected to an anode of the first diode, a dotted terminal of the first primary-side winding is connected to a cathode of the first diode, and a connection point is also connected to a positive terminal of the input DC power supply; a gate of the first switch transistor is connected to a primary-side control signal; characterized in that, the first primary-side winding and the second primary-side winding are bifilar-wound, and a first capacitor is further comprised; one end of the first capacitor is connected to the undotted terminal of the first primary-side winding, and the other end of the first capacitor is connected to the undotted terminal of the second primary-side winding, and a gate of the second switch transistor is connected to a secondary-side control signal.

Preferably, the secondary-side control signal is a PWM signal controlled by a voltage between the positive output and the negative output.

As an improvement to the foregoing four solutions and preferred solutions thereof, a duty cycle of the primary-side control signal is fixed.

Preferably, a duty cycle of the primary-side control signal is provided according to m times of an actual output power of a secondary side, and the duty cycle does not increase until reaching a maximum duty cycle.

Preferably, directions of physical paths of excitation currents of the first primary-side winding and the second primary-side winding during PCB wiring are opposite.

The working principle will be illustrated in detail with reference to embodiments. The beneficial effects of the present invention are: leakage inductance between primary and secondary-side windings is allowed to be relatively large, and bifilar winding is still used on the primary side, the conversion efficiency is high, the EMI performance is good, and the bandwidth is relatively good.

BRIEF DESCRIPTION OF THE DRAWINGS

FIG. 1-1 is a schematic diagram of charging a capacitor C1 during power-on in the first embodiment.

FIG. 1-2 is a schematic diagram of a voltage polarity after charging of the capacitor C1 is completed after power-on in the first embodiment.

FIG. 1-3 is a schematic diagram of generating two paths of excitation currents 41 and 42 during saturation conduction of Q1 in the first embodiment.

FIG. 1-4 is a schematic diagram of generating a freewheeling current 43 and a demagnetizing current 4 during disconnection of Q1 in the first embodiment.

FIG. 1-5a is a waveform graph of Q2 working in a first mode in the first embodiment.

FIG. 1-5b is a waveform graph of Q2 working in a second mode in the first embodiment.

FIG. 1-5c is a waveform graph of Q2 working in a third mode in the first embodiment.

FIG. 1-6 is an equivalent principle diagram in a secondary-side rectifier circuit in FIG. 1 in the first embodiment.

FIG. 2 is a diagram of a principle of a second embodiment corresponding to solution 2 of a flyback switching power supply of the present invention.

FIG. 2-1 is a diagram of a principle of using a P-channel field-effect transistor in a secondary-side rectifier circuit in the present invention.

FIG. 2-2 is a diagram of an equivalent principle of using a P-channel field-effect transistor in a secondary-side rectifier circuit in the present invention.

FIG. 3 is a diagram of a principle of a third embodiment corresponding to solution 3 of a flyback switching power supply of the present invention.

FIG. 4 is a diagram of a principle of a fourth embodiment corresponding to solution 4 of a flyback switching power supply of the present invention.

DETAILED DESCRIPTION OF THE INVENTION

First Embodiment

Figure 1:
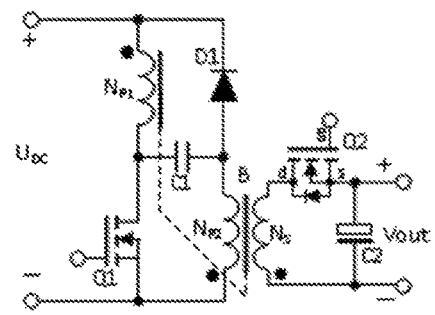
FIG. 1 is a diagram of a principle of a first embodiment corresponding to solution 1 of a flyback switching power supply of the present invention.
Figure 1:
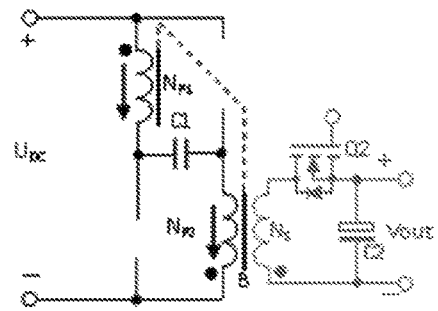

FIG. 1 is a diagram of a principle of a flyback switching power supply according to a first embodiment of the present invention. The flyback switching power supply includes a transformer B, a first switch transistor Q1, and a second switch transistor Q2, where the first switch transistor Q1 and the second switch transistor Q2 are both N-channel field-effect transistors, a second capacitor C2, and a first diode D1. The transformer B includes a first primary-side winding $N_{P1}$, a second primary-side winding $N_{P2}$, and a secondary-side winding $N_S$. An undotted terminal of the secondary-side winding $N_S$ is connected to a drain d of the second switch transistor Q2, and a source s of the second switch transistor Q2 is connected to one end of the second capacitor C2, to form positive output, which is the + end of Vout in the figure. A dotted terminal of the secondary-side winding $N_S$ is connected to the other end of the second capacitor C2, to form negative output, which is the − end of Vout in the figure. A positive terminal + of an input DC power supply $U_{DC}$ is connected to both a dotted terminal of the first primary-side winding $N_{P1}$ and a cathode of the first diode D1, and an undotted terminal of the first primary-side winding $N_{P1}$ is connected to a drain d of the first switch transistor Q1. An anode of the first diode D1 is connected to an undotted terminal of the second primary-side winding $N_{P2}$, a source s of the first switch transistor Q1 is connected to a dotted terminal of the second primary-side winding $N_{P2}$, and a connection point is also connected to a negative terminal − of the input DC power supply $U_{DC}$. A gate g of the first switch transistor Q1 is connected to a primary-side control signal. The first primary-side winding $N_{P1}$ and the second primary-side winding $N_{P1}$ are bifilar-wound, and a first capacitor C1 is further included. One end of the first capacitor C1 is connected to the undotted terminal of the first primary-side winding $N_{P1}$, and the other end of the first capacitor C1 is connected to the undotted terminal of the second primary-side winding $N_{P2}$, and a gate g of the second switch transistor Q2 is connected to a secondary-side control signal. The secondary-side control signal is a PWM signal controlled by a voltage between the positive output and the negative output.

Dotted terminal: the end marked by a black dot in the winding in the figure.

Undotted terminal: the end not marked by a black dot in the winding in the figure.

Primary-side control signal: various square waves including a PWM pulse width modulated signal, a PFM pulse frequency modulation, and the like.

Secondary-side control signal: a PWM signal controlled by a voltage between the positive output and the negative output, and various square waves including a PWM pulse width modulated signal, a PFM pulse frequency modulation, and the like are all referred to as PWM signals.

Transformer B: magnetic cores of the first primary-side winding $N_{P1}$ and the second primary-side winding $N_{P2}$ are connected by a dotted line in the figure, indicating that they are wound on a transformer, and share a same magnetic core, and the transformer is not an independent transformer, and the drawing method in the figure is used only for clear patterns and a simple connection relationship.

In FIG. 1, the source of the N-channel field-effect transistor Q1 is connected to the dotted terminal of the second primary-side winding $N_{P2}$, and the connection point is also connected to the negative terminal − of the input DC power supply $U_{DC}$. Namely, the source of the field-effect transistor Q1 is connected to the negative terminal − of the input DC power supply $U_{DC}$, and this is not directly present in actual application, because in the field of switching power supplies, unnecessary factors are omitted during analysis of a working principle of basic topology. In actual application, the source of the field-effect transistor is connected to a current detection resistor or a current mutual inductor to detect an average current or a peak current to implement various control policies. Connection to the source through the current detection resistor or the current mutual inductor is equivalent to connection to the source, and this is a common technology in the art, and this application complies with a default rule in the industry. If a current mutual inductor is used, the current mutual inductor may appear anywhere in the exciting circuit, such as a drain of a field-effect transistor, a dotted terminal or an undotted terminal of the first primary-side winding, and in addition to a conventional magnetic core type mutual inductor whose primary side is one turn, and whose secondary side is a coil with a plurality of turns, the current mutual inductor may also be a Hall sensor.

Working principle: Referring to FIG. 1, when the first capacitor C1 (for the convenience of analysis, according to the standard of the textbook, the first capacitor C1 is referred to as a capacitor C1 or C1 hereinafter; this also applies to other devices, for example, an input DC power supply is referred to as a DC power supply or a power supply) does not exist, the primary side part of the circuit is a flyback switching power supply demagnetized by a third winding, and the second primary-side winding $N_{P2}$ becomes the "third winding" dedicated for demagnetization. However, after the capacitor C1 is added to the present invention, the working principle of the circuit is completely different from that of the prior art.

When the circuit of FIG. 1 is powered on, D1 does not work due to reverse bias, and Q1 is equivalent to an open circuit because the primary-side control signal is not received. Then the DC power supply $U_{DC}$ charges C1 through the first primary-side winding $N_{P1}$. At the same time, the current returns to the negative terminal of the DC power supply $U_{DC}$ through the second primary-side winding $N_{P2}$. As shown in FIG. 1-1, the direction of the current charging C1 is marked by two arrows: the current flows from the dotted terminal to the undotted terminal in $N_{P1}$; and the current flows from the undotted terminal to the dotted terminal in $N_{P2}$. $N_{P1}$ and $N_{P2}$ are bifilar-wound, the two charging currents are equal in magnitude, and the generated magnetic fluxes are opposite, and are completely offset. That is, during power-on, the DC power supply $U_{DC}$ charges C1 through the two windings of the transformer B. Because the two windings are offset due to the mutual inductance effect, and do not work, it is equivalent to that C1 is connected in parallel to the DC power supply $U_{DC}$ through DC internal resistances of $N_{P1}$ and $N_{P2}$, and C2 stills implements the function of power supply filtering and decoupling.

Figures 1, 2:
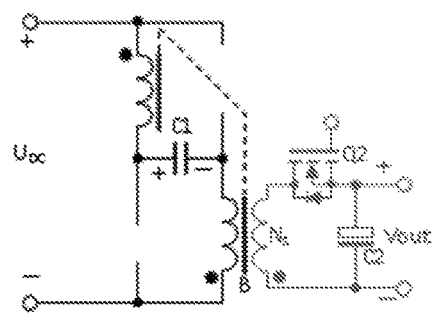

As time passes by, the end voltage of C1 is equal to the voltage of $U_{DC}$, and the left is positive and the right is negative, as shown in FIG. 1-2.

Figures 1, 2, 3:
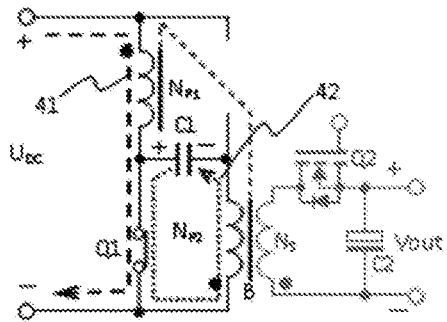

When Q1 normally receives the primary-side control signal, taking one period as an example, when the gate of Q1 is high level, Q1 is saturated and conducted, and its internal resistance is equal to the on-state internal resistance $R_{ds(ON)}$. For the convenience of analysis, this case is considered as direct conduction, which is a wire, as shown in FIG. 1-3. D1 is in a reverse biased state and does not participate in work. In this case, two excitation currents are generated, as shown by 41 and 42 in FIG. 1-3.

The current 41: from the positive terminal of the DC power supply $U_{DC}$, enters through the dotted terminal of the first primary-side winding $N_{P1}$ and exits from the undotted terminal of $N_{P1}$, enters through the drain of Q1, and exits through the source of Q1, and returns to the negative terminal of the DC power supply $U_{DC}$.

The current 42: from the left positive terminal of the capacitor C1, enters through the drain of Q1 and exits from the source of Q1, then enters through the dotted terminal of the second primary-side winding $N_{P2}$, and exits through the undotted terminal of $N_{P2}$, and returns to the right negative terminal of the capacitor C1.

For convenience, the negative terminal of the DC power supply $U_{DC}$ is referred to as ground. Because the left positive terminal of C1 is connected to the negative terminal of the DC power supply $U_{DC}$ through the saturated and conducted Q1, that is, grounded, then, the voltage on the right negative terminal of C1 is approximately $-U_{DC}$; in this excitation process, If the end voltage of C1 has a tendency to decline due to insufficient capacity, that is, the voltage on the right negative terminal of C1 has a tendency to rise, and its absolute value is less than $U_{DC}$, then, in the excitation process, when Q1 is saturated and conducted to excite the first primary-side winding $N_{P1}$, the dotted terminal induces a positive voltage, and the undotted terminal induces a negative voltage, and the size is equal to the voltages applied to two ends of $N_{P1}$, and is equal to $U_{DC}$. In this case, because $N_{P1}$ and $N_{P2}$ are bifilar-wound, the two ends of $N_{P2}$ also induce: the dotted terminal induces a positive voltage, and the undotted terminal induces a negative voltage, and the size is equal to $U_{DC}$, and this voltage directly charges C1. This is a forward process, so that the end voltage of C1 does not drop due to insufficient capacity. As mentioned above, the power supply $U_{DC}$ charges C1 through the two windings of the transformer B; because the two windings are offset due to the mutual inductance effect, and do not work, it is equivalent to that C1 is connected in parallel to the power supply $U_{DC}$ through DC internal resistances of $N_{P1}$ and $N_{P2}$, and the power supply $U_{DC}$ directly supplements electric energy to C1 by using extremely low DC internal resistance, and an end voltage thereof maintains stable.

It can be seen that the excitation currents of 41 and 42 are in parallel relationship. Because $N_{P1}$ and $N_{P2}$ have the same inductance and the same excitation voltage, which are both equal to $U_{DC}$, 41 and 42 are completely equal. In the excitation process, the secondary-side winding $N_S$ also generates an induced voltage according to a turn ratio. The induced voltage is: the dotted terminal induces a positive voltage, and the undotted terminal induces a negative voltage; the size is equal to $U_{DC}$ multiplied by the turn ratio n, that is, the $N_S$ induces a voltage with a positive lower part and a negative upper part. This voltage is connected in series to the end voltage of C2, and is applied to two ends of Q2. Q2 is reverse-biased, and is not conducted. In this case, the secondary side is equivalent to zero load and has no output.

In the excitation process, the currents of 41 and 42 increase linearly upward. The current direction is: the currents flow from the dotted terminal to the undotted terminal in the inductor.

To ensure that the electromagnetic compatibility meets the requirements of use, it is tricky during wiring. Observing 41 and 42 in FIG. 1-3, 41 is in the clockwise current direction, and 42 is in the counterclockwise direction. If during circuit board wiring, it is also ensured that the one of the two currents is in the clockwise direction and the other one is in the counterclockwise direction, then magnetic fluxes generated during excitation can be offset when observed from a relatively far place. In this case, the EMI performance of the flyback switching power supply of the present invention will be very good.

When the gate of Q1 changes from high level to low level, Q1 also changes from saturation and conduction to disconnection. The current in the inductor cannot change abruptly. Even though Q1 is already disconnected in this case, the currents of 41 and 42 still flow from the dotted terminal to the undotted terminal. Because the current loop of the primary side has been cut off, the energy in the magnetic core flows from the dotted terminal to the undotted terminal on the secondary side. Referring to FIG. 1-4, the current flowing from the dotted terminal to the undotted terminal appears on the secondary-side winding $N_S$. As shown in 43 in FIG. 1-4, the initial magnitude of the current=(the sum of 41 and 42 at the instant of disconnection of Q1)/turn ratio n. Whether the current exists depends on whether Q2 is in a conducted state synchronously. Q2 is replaced with a rectifier diode, which is denoted as D2 for the convenience of description. Then the conduction of D2 is passive, and the total duration of its conduction is denoted as $T_D$. $T_D$ is a variable. According to the law of the inductance voltage voltage-second balance, when the excitation time of Q1 changes, $T_D$ is also changing. The total conduction duration $T_D$ of D2 is a hypothetical variable.

Because the gate g of Q2 is connected to the secondary-side control signal, and the secondary-side control signal is a PWM signal controlled by the voltage between the positive output and negative output, a plurality of working modes is obtained.

In a first working mode, Q2 and D2 are synchronously conducted, and the working duration is equal to $T_D$. This is the flyback switching power supply with output synchronous rectification, and the bandwidth is not changed. This mode is similar to the conventional synchronous rectification working mode, but is still different. In the conventional synchronous rectification, the body diode in the synchronous rectifier tube is in the same direction as the hypothetical rectifier diode D2, but in the present invention, referring to FIG. 1, according to the connection of the technical solution, the body diode of Q2 is in the direction opposite to the direction of D2.

In a second working mode, Q2 is conducted in a time shorter than $T_D$ in the $T_D$ time, and is a switching mode controlled by a Vout voltage. When the output voltage is lower than the standard value, after the next period or several periods, the conduction time of Q2 increases. When the output voltage is higher than the standard value, after the next period or several periods, the conduction time of Q2 decreases. That is, in the present invention, through a special circuit structure, the primary side implements lossless demagnetization through D1. In this way, it is possible to make Q1 in an overexcited state. The transformer B operates as an inductor in the flyback switching power supply. Q1 has sufficient energy stored in transformer B, and the conduction duty cycle of Q2 can be directly controlled by the secondary-side output voltage Vout. In this way, secondary side control with extremely short control delay is implemented. The secondary side control is almost in real-time mode. When the output voltage is higher than the standard value, that is, the load becomes lighter, after the next period or several periods, conduction time of Q2 is shortened. In this way, the output voltage decreases. When the output voltage is lower than the standard value, that is, the load becomes heavier, after the next period or several periods, the conduction time of Q2 increases, and Q2 releases more energy from the transformer B to the output end through the $N_S$, so that the output voltage rises quickly to reach the standard value.

That is, the duty cycle of the primary-side control signal is provided according to m times of the actual output power of the secondary side. In actual implementation, because the stored energy is proportional to the square of the excitation current, the excitation current is linearly proportional to the duty cycle. That is, when m is 1.1, the actual stored energy is square of 1.1, which is 1.21. That is, 21% of energy is reserved to deal with the load abrupt change of the output end. If 100% of the energy is reserved to deal with the load abrupt change of the output end, that is, double of the output power, then m only needs to be about 1.41 times, that is, the original duty cycle is 0.1. In this case, (primary-side excitation energy×efficiency)=energy output by the secondary side in the same period. Then the duty cycle of the present invention needs to operate according to 0.141. Obviously, m is a value greater than 1. When m is 2, the square thereof is 4, the stored energy is 4, and the actual output is only 1, which is equivalent to reserving 300% energy storage.

Then, Q2 is conducted in a time shorter than $T_D$ in the $T_D$ time, and there are also three working modes.

1) In a first mode, Q2 and $T_D$ are synchronously conducted, and the waveform diagram is shown in FIG. 1-5*a*, that is, the Q2 switch transistor for output rectification is conducted synchronously with the hypothetical diode D2, but can be disconnected in advance. $U_{gs\_1}$ is the gate control signal of Q1; $i_{Q1}$ is the drain current of Q1, which is also the sum of the excitation currents of 41 and 42; $U_{gs\_2}$ is the gate control signal of Q2; $i_{Q2}$ is the drain current of Q2, and is also the power supply current to the filter capacitor and load; iD1 is the demagnetization current of D1, and the energy is recovered by $U_{DC}$. $i_{Q2}$ and $i_{D1}$ form a complete demagnetization current.

2) In a second mode, Q2 is conducted in the middle of $T_D$, and the waveform diagram is shown in FIG. 1-5*b*, that is, the Q2 switch transistor for output rectification is conducted in the middle of the hypothetical diode D2, is conducted in a delayed manner, but can be disconnected in advance. $U_{gs\_1}$ is the gate control signal of Q1; $i_{Q1}$ is the drain current of Q1, which is also the sum of the excitation currents of 41 and 42; $U_{gs\_2}$ is the gate control signal of Q2; $i_{Q2}$ is the drain current of Q2, and is also the power supply current to the filter capacitor and load; $i_{D1}$ is the demagnetization current of D1, is divided into two segments, and the energy is recovered by $U_{DC}$. $i_{Q2}$ and two segments of $i_{D1}$ form a complete demagnetization current.

3) In a third mode, Q2 and $T_D$ are synchronously ended, and the waveform diagram is shown in FIG. 1-5*a*, that is, the Q2 switch transistor for output rectification is disconnected synchronously with the hypothetical diode D2. $U_{gs\_1}$ is the gate control signal of Q1; $i_{Q1}$ is the drain current of Q1, which is also the sum of the excitation currents of 41 and 42; $U_{gs\_2}$ is the gate control signal of Q2; $i_{Q2}$ is the drain current of Q2, and is also the power supply current to the filter capacitor and load; $i_{D1}$ is the demagnetization current of D1, and the energy is recovered by $U_{DC}$. $i_{Q2}$ and $i_{D1}$ form a complete demagnetization current. In this mode, because of the relatively small current of Q2, the output power is small, and this mode is suitable for a light load mode.

Certainly, a secondary-side control dedicated IC may be designed, which is freely switched according to load variation in the above three modes to achieve optimal control.

Figure 0:
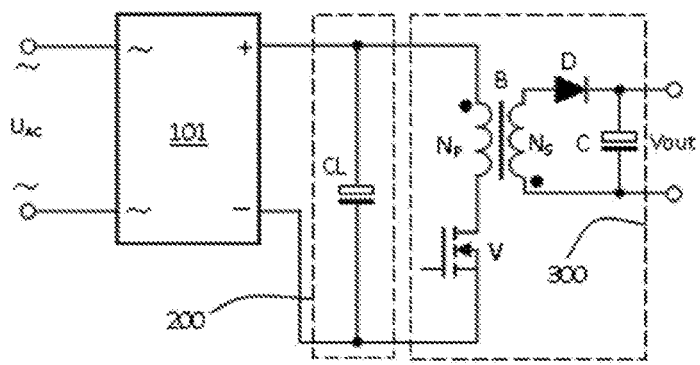
FIG. 0 is a diagram of a principle of using an existing flyback switching power supply for AC to DC conversion.

The output end of the conventional flyback switching power supply obtains energy when the power supply of the primary-side winding is disconnected, and therefore this name is obtained, and the output voltage depends on the loop control circuit and is not related to the turn ratio of the primary side to the secondary side of the flyback transformer (for example, the transformer in the series figures such as FIG. 0 and FIG. 1). In the process of energy transfer, the transformer B does not implement the function of voltage conversion, but implements the function of the freewheeling of the magnetic core, and is an isolated version of the Buck-Boost converter. Therefore, the transformer B is often referred to as a flyback transformer.

In the present invention, the output voltage is also controlled by the secondary-side control signal of Q2, and the secondary-side control signal is a PWM signal controlled by the voltage between the positive output and the negative output, which is actually a very special secondary-side control mode. In most cases, the conduction of Q2 is less than $T_D$. Only when the load current suddenly becomes large, it is possible to have the completely same working duration as $T_D$. However, as the load current continues to stabilize under a large current, the duty cycle of Q1 of the primary side then increases, and abundant energy is still supplied to the secondary side, to ensure that energy is quickly released to the secondary side when the load suddenly changes again.

Because the primary-side winding and the secondary-side winding are generally not possible to be bifilar-wound, there must be a leakage inductance. The energy stored on the primary-side winding magnetizing inductance is transmitted to the secondary-side winding $N_S$ and output end through transformer B after Q1 is disconnected, but the energy on the leakage inductance is not transmitted, causing overvoltage on both ends of the Q1 tube and damaging the Q1 tube. The circuit for demagnetizing the leakage inductance of the present invention is composed of D1 and the second primary-side winding $N_{P2}$. This circuit simultaneously demagnetizes Q2 when Q2 is disconnected in advance and is not conducted in time. The working principle thereof is as follows.

The first primary-side winding $N_{P1}$ and second primary-side winding $N_{P2}$ are bifilar-wound, and the leakage inductance between the two windings is zero. At the instant of disconnection of Q1 and thereafter, the energy on the leakage inductance is not transmitted to secondary side; the current direction of the electrical energy of the leakage inductance in the second primary-side winding $N_{P2}$ is the same as the direction during the excitation, and the current flows from the dotted terminal to the undotted terminal, that is, flows from bottom to top in FIG. 1-4; D1 is switched on, and the electric energy is absorbed by the DC power supply $U_{DC}$, to form the leakage inductance demagnetization current shown by 44.

The electrical energy of the leakage inductance in the first primary-side winding $N_{P1}$ is coupled to the second primary-side winding $N_{P2}$ without leakage inductance. Demagnetization is implemented by D1, so that the leakage inductance demagnetization current shown by 44 is also formed. Demagnetization when Q2 is disconnected in advance and is not conducted in time is similar to this, and analysis is not made again.

Obviously, the output voltage $V_{out}$ is divided by the turn ratio n to obtain the "reflected voltage" formed on the primary side when the secondary-side winding $N_S$ is conducted. For good demagnetization, the reflected voltage cannot be greater than the value of the DC power supply $U_{DC}$. In this way, this circuit can work well. Because the currents of 41 and 42 are the same, the first primary-side winding and the second primary-side winding have the same wire diameter, so that the winding is convenient. That the wire diameters are the same described herein includes that they are Litz wires of the same specification, may have different colors, namely, they are stranded by stranded wires. To facilitate identification, wire materials of the same specification including Litz wires may have different colors. As the working frequency increases, the high frequency current more tends to flow on the surface of the enameled wire. In this case, the Litz wire can solve this problem. Certainly, enameled wires of two different colors are first used to make the Litz wires. Direct winding is performed, and then the first primary-side winding and the second primary-side winding are distinguished by color, or the wire diameters and the number of strands of the two windings are different, but both achieve the objective of the invention.

The circuit has an extremely large number of variations, and it is difficult to completely protect them by claims. For example, for FIG. 1, because Q2 and $N_S$ are connected in series, when the positions of them are interchanged, they are completely operable. That is, the secondary side of FIG. 1 is replaced with the secondary-side rectifier circuit in FIG. 1-6, and the objective of the invention is also achieved. The position interchange in the series circuit is considered as equivalent replacement.

Referring to FIG. 1-6, another connection relationship of the secondary-side rectifier circuit is: an undotted terminal of the secondary-side winding $N_S$ is connected to one end of a second capacitor C2, to form positive output, which is the + end of $V_{out}$ in the figure. A dotted terminal of the secondary-side winding $N_S$ is connected to the source s of the second switch transistor Q2, the drain d of the second switch transistor Q2 is connected to one end of the second capacitor C2, to form negative output, which is the − end of $V_{out}$ in the figure. By replacing the secondary-side rectifier circuit of FIG. 1 with it, the objective of the invention is also achieved.

It can be seen that compared with the conventional three-winding absorption flyback switching power supply, the present invention has many differences, mainly including: the "third winding" of the conventional three-winding absorption flyback switching power supply does not participate in the excitation, and only participates in demagnetization. In the present invention, there is no third winding, and both two primary-side windings participate in the excitation, and in the demagnetization, the second primary-side winding $N_{P2}$ participates in the demagnetization of the leakage inductance, thereby achieving the lossless absorption of the leakage inductance energy. Because the lossless absorption of the leakage inductance energy is realized, the leakage inductance of the primary and secondary sides is allowed to be large, and the conversion efficiency of the switching power supply is not affected, so that high efficiency is achieved, and in the present invention, the demagnetization winding is the second primary-side winding $N_{P2}$, which also participates in excitation, improves the current density of the primary-side winding and increases the power density of the switching power supply. The source of the DC power supply $U_{DC}$ can be obtained by electrolytic capacitor filtering or valley fill circuit filtering after rectification of AC power. Further, in the present invention, more energy is provided to the magnetic core of the transformer B, and Q2 of the secondary side is rectified as needed for output, and the secondary side control is realized, so that the bandwidth becomes good.

Therefore, compared with the prior art, the beneficial effects of the present invention are: leakage inductance between primary and secondary-side windings is allowed to be relatively large, and bifilar winding is still used on the primary side, the conversion efficiency is high, the EMI performance is good, and the bandwidth is relatively good.

Second Embodiment

The present invention further provides an equivalent solution of the first embodiment, corresponding to solution 2. Referring to FIG. 2, a flyback switching power supply, including a transformer B, a first switch transistor Q1, a second switch transistor Q2, where the first switch transistor Q1 and the second switch transistor Q2 are both N-channel field-effect transistors, a second capacitor C2, and a first diode D1, where the transformer B includes a first primary-side winding $N_{P1}$, a second primary-side winding $N_{P2}$, and a secondary-side winding $N_S$. An undotted terminal of the secondary-side winding $N_S$ is connected to a drain d of the second switch transistor Q2, and a source s of the second switch transistor Q2 is connected to one end of the second capacitor C2, to form positive output, which is the + end of $V_{out}$ in the figure. A dotted terminal of the secondary-side winding $N_S$ is connected to the other end of the second capacitor C2, to form negative output, which is the − end of $V_{out}$ in the figure. A positive terminal + of an input DC power supply $U_{DC}$ is connected to both a drain d of the first switch transistor Q1 and the undotted terminal of the second primary-side winding $N_{P2}$, and a source s of the first switch transistor Q1 is connected to a dotted terminal of the first primary-side winding $N_{P1}$. The dotted terminal of the second primary-side winding $N_{P2}$ is connected to a cathode of the first diode D1, an undotted terminal of the first primary-side winding $N_{P1}$ is connected to an anode of the first diode D1, and a connection point is also connected to a negative terminal − of the input DC power supply $U_{DC}$. A gate g of the first switch transistor Q1 is connected to a primary-side control signal. The first primary-side winding $N_{P1}$ and the second primary-side winding $N_{P2}$ are bifilar-wound, and a first capacitor C1 is further included; one end of the first capacitor C1 is connected to the dotted terminal of the first primary-side winding $N_{P1}$, and the other end of the first capacitor C1 is connected to the dotted terminal of the second primary-side winding $N_{P2}$, and a gate g of the second switch transistor Q2 is connected to a secondary-side control signal. The secondary-side control signal is a PWM signal controlled by a voltage between the positive output and the negative output.

In fact, the second embodiment is an equivalent deformation of the first embodiment: based on FIG. 1 of the first embodiment, the positions of the devices connected in series of the two excitation circuits are simultaneously interchanged vertically, that is, positions of $N_{P1}$ and Q1 are interchanged, and positions of D1 and $N_{P2}$ are also interchanged at the same time, and C1 is still connected between the connection points of the two devices connected in series, and the circuit of FIG. 2 of the second embodiment is obtained. Because the source voltage of Q1 is variable, this circuit is floating drive, costs thereof should be relatively high, and the circuit is not used generally.

A brief description of its working principle as follows.

Referring to FIG. 2, when the circuit is powered on, D1 does not work due to reverse bias, and Q1 does not work because it does not receive the primary-side control signal, which is equivalent to an open circuit, then the DC power supply $U_{DC}$ charges C1 through $N_{P2}$. The current simultaneously returns to the negative terminal of the DC power supply $U_{DC}$ through $N_{P1}$. Also, during power-on, the DC power supply $U_{DC}$ charges C1 through the two windings of the transformer B. These two windings are offset due to the mutual inductance effect, and do not work, and this is equivalent to that C1 is connected in parallel to the DC power supply $U_{DC}$ through DC internal resistances of $N_{P2}$ and $N_{P1}$, and C1 still implements the function of power supply filtering and decoupling.

As time passes by, the end voltage of C1 is equal to the voltage of $U_{DC}$, and the right is positive and the left is negative.

When Q1 is saturated and conducted, the internal resistance thereof is equal to on-stated internal resistance $R_{ds(ON)}$, and is also considered as a wire as stated above. In this case, two excitation currents are generated.

The first current: from the positive terminal of the DC power supply $U_{DC}$, enters through the drain of Q1 and exits from the source of Q1, then enters through the dotted terminal of the first primary-side winding $N_{P1}$, and exits through the undotted terminal of $N_{P1}$, and returns to the negative terminal of the DC power supply $U_{DC}$.

The second current: from the right positive terminal of the capacitor C1, enters through the dotted terminal of the second primary-side winding $N_{P2}$ and exits from the undotted terminal of $N_{P2}$, enters through the drain of Q1, and exits through the source of Q1, and returns to the left negative terminal of the capacitor C1.

For convenience, the negative terminal of the DC power supply $U_{DC}$ is assumed to be grounded herein, and is referred to as ground. Because the left negative terminal of C1 is connected to the positive terminal of the DC power supply $U_{DC}$ through the saturated and conducted Q1, then, the voltage of the right positive terminal of C1 is about 2 $U_{DC}$ to ground. In this excitation process, if the end voltage of C1 has insufficient capacity, that is, the voltage on the right positive terminal of C1 has a tendency to decrease, absolute values of two ends of C1 are less than $U_{DC}$, then, in the excitation process, when Q1 is saturated and conducted to excite the first primary-side winding $N_{P1}$, the dotted terminal induces a positive voltage, and the undotted terminal induces a negative voltage, and the size is equal to the voltages applied to two ends of $N_{P1}$, and is equal to $U_{DC}$. In this case, because $N_{P1}$ and $N_{P2}$ are bifilar-wound, the two ends of $N_{P2}$ also induce: the dotted terminal induces a positive voltage, and the undotted terminal induces a negative voltage, and the size is equal to $U_{DC}$, and this voltage directly charges C1. This is a forward process, so that the end voltage of C1 does not drop due to insufficient capacity. As mentioned above, the DC power supply $U_{DC}$ charges C1 through the two windings of the transformer B; because the two windings are offset due to the mutual inductance effect, and do not work, it is equivalent to that C1 is connected in parallel to the DC power supply $U_{DC}$ through DC internal resistances of $N_{P1}$ and $N_{P2}$, and the DC power supply $U_{DC}$ directly supplements electric energy to C1 by using extremely low DC internal resistance, and an end voltage thereof maintains stable.

It can be seen that the first and second excitation currents are in parallel relationship. Because $N_{P1}$ and $N_{P2}$ have the same inductance and the same excitation voltage, which are both equal to $U_{DC}$, the two currents are completely equal. In the excitation process, the secondary-side winding $N_S$ also generates an induced voltage according to a turn ratio. The dotted terminal induces a positive voltage, and the undotted terminal induces a negative voltage; the size is equal to $U_{DC}$ multiplied by the turn ratio n, that is, the $N_S$ induces a voltage with a positive lower part and a negative upper part. This voltage is connected in series to the end voltage of C2, and is applied to two ends of Q2. Q2 is reverse-biased, and is not conducted. In this case, the secondary side is equivalent to zero load and has no output.

In the excitation process, the first and second excitation currents increase linearly upward. The current direction is: the currents flow from the dotted terminal to the undotted terminal in the inductor.

When Q1 is disconnected, the current in the inductor cannot abruptly change. The energy in the magnetic core flows from the dotted terminal to the undotted terminal on the secondary side, and a current flowing from the dotted terminal to the undotted terminal appears on the secondary-side winding $N_S$, and the current charges the capacitor C2 by using Q2 conducted in some time, and $V_{out}$ establishes a voltage or continuously outputs energy, and this process is also a partial process of demagnetization. When Q2 is not conducted, the demagnetization current implements demagnetization through D1. The working process thereof is the same as FIG. 1-5*a*, FIG. 1-5*b*, and FIG. 1-5*c*.

The second embodiment is a deformation of the first embodiment, and the working principle is equivalent, and the objective of the invention is also achieved. The technical solution of using the N-channel field-effect transistor may also be realized by using a P-channel field-effect transistor. The P-channel field-effect transistor has a relatively low cost at a low working voltage. In this case, based on the first embodiment, polarities of the power supply, the diode, and the dotted terminal need to be reversed, and the polarity of the output rectifier part does not need to be reversed, and then a third embodiment obtained as follows.

Herein, implementing the secondary-side rectifier circuit by using a P-channel field-effect transistor is first presented. Referring to FIG. 2-1, a secondary-side rectifier circuit: a second switch transistor Q2 is a P-channel field-effect transistor, an undotted terminal of a secondary-side winding $N_S$ is connected to a source s of the second switch transistor Q2, a drain d of the second switch transistor Q2 is connected to one end of the second capacitor C2, to form positive output, which is the + end of Vout in the figure, a dotted terminal of the secondary-side winding $N_S$ is connected to the other end of the second capacitor C2, to form negative output, which is the − end of Vout in the figure.

For example, for FIG. 2-1, because Q2 and $N_S$ are connected in series, when the positions of them are interchanged, they are completely operable. The position interchange in the series circuit is considered as equivalent replacement to obtain the following secondary-side rectifier circuit.

Referring to FIG. 2-2, another connection relationship of the secondary-side rectifier circuit is: a secondary-side rectifier circuit: the second switch transistor Q2 is a P-channel field-effect transistor; an undotted terminal of the secondary-side winding $N_S$ is connected to one end of a second capacitor C2, to form positive output, which is the + end of Vout in the figure. A dotted terminal of the secondary-side winding $N_S$ is connected to the drain d of the second switch transistor Q2, the source s of the second switch transistor Q2 is connected to one end of the second capacitor C2, to form negative output, which is the − end of $V_{out}$ in the figure. By replacing the secondary-side rectifier circuit of FIG. 1 and FIG. 2 with it, the objective of the invention is also achieved.

Third Embodiment

Referring to FIG. 3, also the foregoing solution 3, a flyback switching power supply, including a transformer B, a first switch transistor Q1, a second switch transistor Q2, where the first switch transistor Q1 is a P-channel field-effect transistor, and the second switch transistor Q2 is an N-channel field-effect transistor, a second capacitor C2, and a first diode D1, where the transformer B includes a first primary-side winding $N_{P1}$, a second primary-side winding $N_{P2}$, and a secondary-side winding $N_S$. An undotted terminal of the secondary-side winding $N_S$ is connected to a drain d of the second switch transistor Q2, and a source s of the second switch transistor Q2 is connected to one end of the second capacitor C2, to form positive output, which is the + end of Vout in the figure. A dotted terminal of the secondary-side winding $N_S$ is connected to the other end of the second capacitor C2, to form negative output, which is the − end of Vout in the figure. A negative terminal − of an input DC power supply $U_{DC}$ is connected to both an undotted terminal of the first primary-side winding $N_{P1}$ and an anode of the first diode D1, and a dotted terminal of the first primary-side winding $N_{P1}$ is connected to a drain d of the first switch transistor Q1. A cathode of the first diode D1 is connected to the dotted terminal of the second primary-side winding $N_{P2}$, a source s of the first switch transistor Q1 is connected to the undotted terminal of the second primary-side winding $N_{P2}$, and a connection point is also connected to a positive terminal + of the input DC power supply $U_{DC}$. A gate g of the first switch transistor Q1 is connected to a primary-side control signal. The first primary-side winding $N_{P1}$ and the second primary-side winding $N_{P2}$ are bifilar-wound, and a first capacitor C1 is further included; one end of the first capacitor C1 is connected to the dotted terminal of the first primary-side winding $N_{P1}$, and the other end of the first capacitor C1 is connected to the dotted terminal of the second primary-side winding $N_{P2}$, and a gate g of the second switch transistor Q2 is connected to a secondary-side control signal. The secondary-side control signal is a PWM signal controlled by a voltage between the positive output and the negative output.

Upon comparison between FIG. 1 and FIG. 3, it can be seen that the third embodiment is obtained by reversing the polarities of the DC power supply $U_{DC}$, the diode D1, the dotted terminals of the first primary-side winding $N_{P1}$ and the second primary-side winding $N_{P2}$, and replacing the N transistor with a P transistor as Q1 of the first embodiment. It should be noted that the secondary-side rectifier circuit of the output rectifier part does not need to be changed and remains as it is. Certainly, if the secondary-side rectifier circuit uses the solutions of FIG. 1-6, FIG. 2-1, and FIG. 2-2, the objective of invention can be achieved. In FIG. 3, the positive terminal of the input DC power supply $U_{DC}$ is the ground, and belongs to a switching power supply of negative power supply work, and the P-channel field-effect transistor itself is also driven by the negative level, and this is exactly suitable.

Therefore, the working principle thereof is the same as that of the first embodiment, and details are not described herein again, and the objective of the invention is also achieved.

Fourth Embodiment

Figures 1, 2, 3, 4:
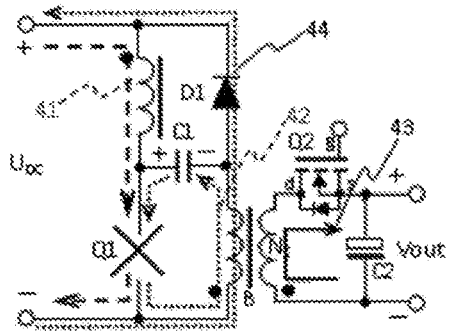
Figures 1, 2, 3, 4, 5, 5A:
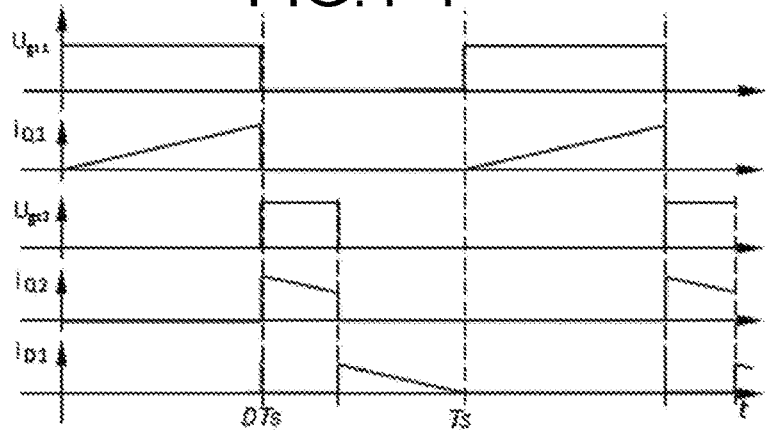
Figures 1, 2, 3, 4, 5, 5B:
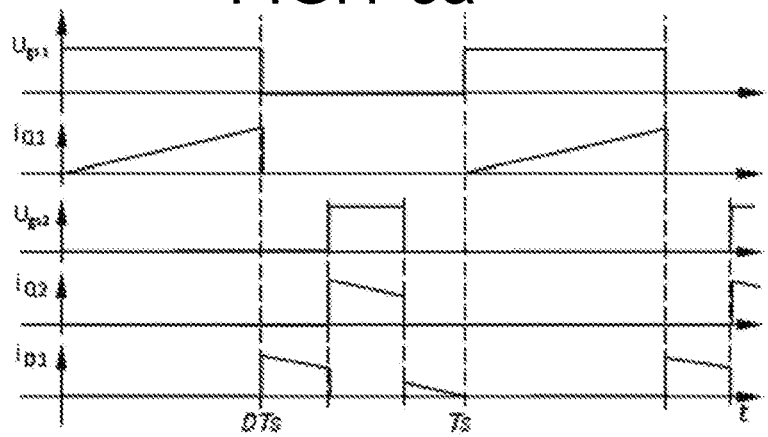
Figures 1, 2, 3, 4, 5, 5C:
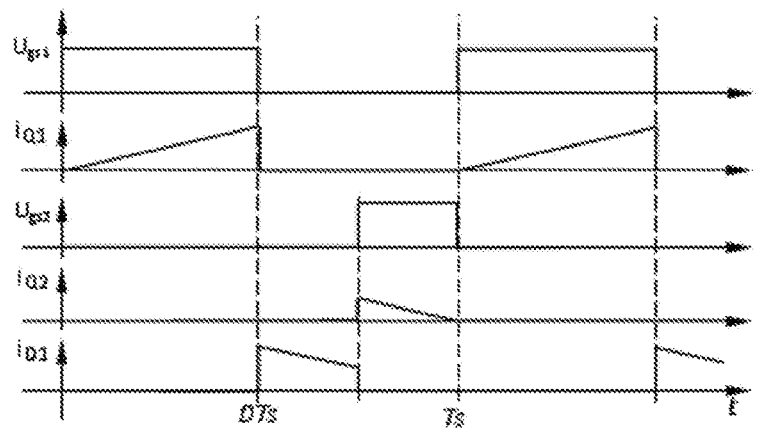
Figures 1, 2, 3, 4, 5, 6:
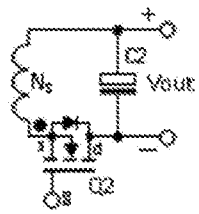
Figure 2:
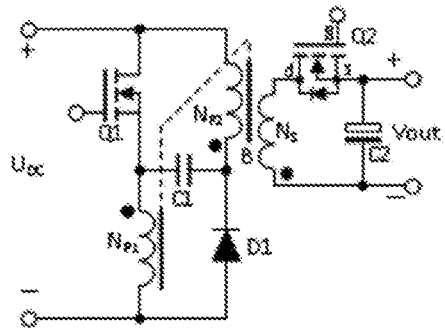
Figures 1, 2:
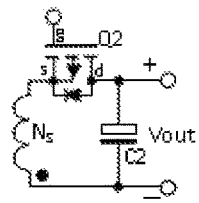
Figure 2:
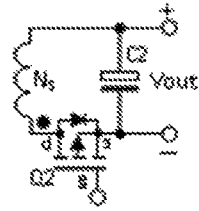
Figure 3:
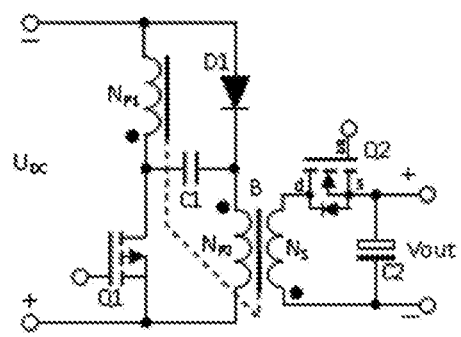
Figure 4:
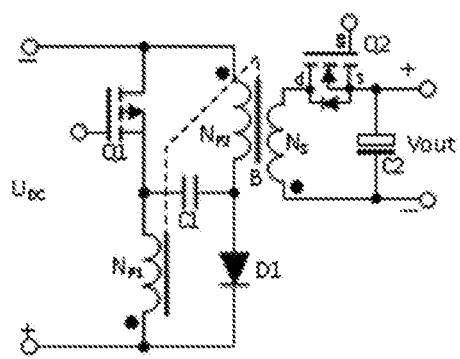

The present invention further provides an equivalent solution of the third embodiment. Referring to FIG. 4, FIG. 4 shows a technical solution of using a P-channel field-effect transistor as Q1 of solution 2. Based on the solution 2, polarities of the power supply, the diode, and the dotted terminal need to be reversed, and the polarity of an output rectifier portion does not need to be reserved. Then solution 4 is obtained: a flyback switching power supply, including a transformer B, a first switch transistor Q1, and a second switch transistor Q2, where the first switch transistor Q1 is a P-channel field-effect transistor, and the second switch transistor Q2 is an N-channel field-effect transistor, a second capacitor C2, and a first diode D1, where the transformer B includes a first primary-side winding $N_{P1}$, a second primary-side winding $N_{P2}$, and a secondary-side winding $N_S$. An undotted terminal of the secondary-side winding $N_S$ is connected to a drain d of the second switch transistor Q2, and a source s of the second switch transistor Q2 is connected to one end of the second capacitor C2, to form positive output, which is the + end of Vout in the figure. A dotted terminal of the secondary-side winding $N_S$ is connected to the other end of the second capacitor C2, to form negative output, which is the − end of $V_{out}$ in the figure. A negative terminal − of an input DC power supply $U_{DC}$ is connected to both a drain d of the first switch transistor Q1 and the dotted terminal of the second primary-side winding $N_{P2}$, and a source s of the first switch transistor Q1 is connected to an undotted terminal of the first primary-side winding $N_{P1}$. The undotted terminal of the second primary-side winding $N_{P2}$ is connected to an anode of the first diode D1, a dotted terminal of the first primary-side winding $N_{P1}$ is connected to a cathode of the first diode D1, and a connection point is also connected to a positive terminal + of the input DC power supply $U_{DC}$. A gate g of the first switch transistor Q1 is connected to a primary-side control signal. The first primary-side winding $N_{P1}$ and the second primary-side winding $N_{P2}$ are bifilar-wound, and a first capacitor C1 is further included; one end of the first capacitor C1 is connected to the undotted terminal of the first primary-side winding $N_{P1}$, and the other end of the first capacitor C1 is connected to the undotted terminal of the second primary-side winding $N_{P2}$, and a gate g of the second switch transistor Q2 is connected to a secondary-side control signal. The secondary-side control signal is a PWM signal controlled by a voltage between the positive output and the negative output.

The fourth embodiment of FIG. 4 is a deformation of the third embodiment: based on FIG. 3 of the third embodiment, the positions of the devices connected in series of the two excitation circuits are interchanged, that is, positions of $N_{P1}$ and Q1 are interchanged, and positions of D1 and $N_{P2}$ are also interchanged at the same time, and C1 is still connected between the two primary-side windings $N_{P1}$ and $N_{P2}$ connected in series, and the circuit of FIG. 4 of the fourth embodiment is obtained. Because the source voltage of Q1 is variable, this circuit is floating drive, costs thereof should be relatively high, and the circuit is not used generally.

Upon comparison between FIG. 2 and FIG. 4, it can be seen that the fourth embodiment is obtained by reversing the polarities of the DC power supply $U_{DC}$, the diode D1, the dotted terminals of the first primary-side winding $N_{P1}$ and the second primary-side winding $N_{P2}$, and replacing the N transistor with a P transistor as Q1 of the second embodiment in FIG. 2. It should be noted that the secondary-side rectifier circuit of the output rectifier part does not need to be changed and remains as it is. Certainly, if the secondary-side rectifier circuit uses the solutions of FIG. 1-6, FIG. 2-1, and FIG. 2-2, the objective of invention can be achieved. In FIG. 4, the positive terminal of the input DC power supply $U_{DC}$ is the ground, and also belongs to a switching power supply of negative power supply work, and the P-channel field-effect transistor itself is also driven by the negative level, and this is exactly suitable.

Therefore, the working principle thereof is the same as that of the second embodiment, and details are not described herein again, and the objective of the invention is also achieved.

The present invention also has a great advantage. When there are multiple paths of outputs on the secondary side, since each path independently controls its rectifier tubes Q2a, Q2b, Q2c, etc. by using its output voltage, the voltage adjustment rate of each output does not affect each other, to achieve high-precision output voltage and good bandwidth of each path.

It should be noted that the primary-side circuit of the present invention includes four cases of FIG. 1, FIG. 2, FIG.

3 and FIG. 4. The secondary-side rectifier circuit includes four cases of FIG. 1, FIG. 2, FIG. 2-1 and FIG. 2-2. Any one of the primary-side circuits and any one of the secondary-side rectifier circuits may be arbitrarily selected for combination, and all can achieve the objective of the invention. The embodiments that are not mentioned above are not described in detail one by one in this specification.

The foregoing descriptions are only preferred embodiments of the present invention, and it should be noted that the above preferred embodiments should not be construed as limiting the present invention. For a person of ordinary skill in the art, without departing from the spirit and scope of the present invention, a number of improvements and modifications, such as adding a control loop to achieve voltage regulation of the output may also be made, this is obviously obtained through the prior art. The improvements and modifications, such as using a switch transistor Q1 of another symbol, adding multipath outputs to secondary-side outputs, and using π-type filtering for filtering, should also be considered as protection scope of the present invention. The embodiments are not described herein, and the protection scope of the present invention should be subject to the appended claims.

What is claimed is:

1. A flyback switching power supply comprising: a transformer, a first switch transistor, a second switch transistor, a second capacitor, and a first diode, wherein the first switch transistor and the second switch transistor are both N-channel field-effect transistors, the transformer comprises a first primary-side winding, a second primary-side winding, and a secondary-side winding, an undotted terminal of the secondary-side winding is connected to a drain of the second switch transistor, a source of the second switch transistor is connected to one end of the second capacitor to form a positive output, and a dotted terminal of the secondary-side winding is connected to the other end of the second capacitor to form a negative output; a positive terminal of an input DC power supply is connected to both a dotted terminal of the first primary-side winding and a cathode of the first diode, and an undotted terminal of the first primary-side winding is connected to a drain of the first switch transistor; an anode of the first diode is connected to an undotted terminal of the second primary-side winding, a source of the first switch transistor is connected to a dotted terminal of the second primary-side winding, and a connection point is also connected to a negative terminal of the input DC power supply; a gate of the first switch transistor is connected to a primary-side control signal; wherein the first primary-side winding and the second primary-side winding are bifilar-wound, the flyback switching power supply further comprises a first capacitor, one end of the first capacitor is connected to the undotted terminal of the first primary-side winding, the other end of the first capacitor is connected to the undotted terminal of the second primary-side winding, and a gate of the second switch transistor is connected to a secondary-side control signal.

2. The flyback switching power supply according to claim 1, wherein the secondary-side control signal is a PWM signal controlled by a voltage between the positive output and the negative output.

3. The flyback switching power supply according to claim 1, wherein a duty cycle of the primary-side control signal is fixed.

4. The flyback switching power supply according to claim 1, wherein a duty cycle of the primary-side control signal is provided according to m times of an actual output power of a secondary side, and the duty cycle does not increase until reaching a maximum duty cycle.

5. The flyback switching power supply according to claim 1, wherein directions of physical paths of excitation currents of the first primary-side winding and the second primary-side winding during PCB wiring are opposite.

6. A flyback switching power supply comprising: a transformer, a first switch transistor, a second switch transistor, a second capacitor, and a first diode, wherein the first switch transistor and the second switch transistor are both N-channel field-effect transistors, the transformer comprises a first primary-side winding, a second primary-side winding, and a secondary-side winding, an undotted terminal of the secondary-side winding is connected to a drain of the second switch transistor, a source of the second switch transistor is connected to one end of the second capacitor to form a positive output, and a dotted terminal of the secondary-side winding is connected to the other end of the second capacitor to form a negative output; a positive terminal of an input DC power supply is connected to both a drain of the first switch transistor and the undotted terminal of the second primary-side winding, and a source of the first switch transistor is connected to a dotted terminal of the first primary-side winding; the dotted terminal of the second primary-side winding is connected to a cathode of the first diode, an undotted terminal of the first primary-side winding is connected to an anode of the first diode, and a connection point is also connected to a negative terminal of the input DC power supply; a gate of the first switch transistor is connected to a primary-side control signal; wherein the first primary-side winding and the second primary-side winding are bifilar-wound, the flyback switching power supply further comprises a first capacitor, one end of the first capacitor is connected to the dotted terminal of the first primary-side winding, the other end of the first capacitor is connected to the dotted terminal of the second primary-side winding, and a gate of the second switch transistor is connected to a secondary-side control signal.

7. The flyback switching power supply according to claim 6, wherein the secondary-side control signal is a PWM signal controlled by a voltage between the positive output and the negative output.

8. The flyback switching power supply according to claim 6, wherein a duty cycle of the primary-side control signal is fixed.

9. The flyback switching power supply according to claim 6, wherein a duty cycle of the primary-side control signal is provided according to m times of an actual output power of a secondary side, and the duty cycle does not increase until reaching a maximum duty cycle.

10. The flyback switching power supply according to claim 6, wherein directions of physical paths of excitation currents of the first primary-side winding and the second primary-side winding during PCB wiring are opposite.

11. A flyback switching power supply comprising: a transformer, a first switch transistor, a second switch transistor, a second capacitor, and a first diode, wherein the first switch transistor is a P-channel field-effect transistor and the second switch transistor is an N-channel field-effect transistor, the transformer comprises a first primary-side winding, a second primary-side winding, and a secondary-side winding, an undotted terminal of the secondary-side winding is connected to a drain of the second switch transistor, a source of the second switch transistor is connected to one end of the second capacitor to form a positive output, and a dotted terminal of the secondary-side winding is connected to the other end of the second capacitor to form a negative output;

a negative terminal of an input DC power supply is connected to both an undotted terminal of the first primary-side winding and an anode of the first diode, and a dotted terminal of the first primary-side winding is connected to a drain of the first switch transistor; a cathode of the first diode is connected to the dotted terminal of the second primary-side winding, a source of the first switch transistor is connected to the undotted terminal of the second primary-side winding, and a connection point is also connected to a positive terminal of the input DC power supply; a gate of the first switch transistor is connected to a primary-side control signal; wherein the first primary-side winding and the second primary-side winding are bifilar-wound, the flyback switching power supply further comprises a first capacitor, one end of the first capacitor is connected to the dotted terminal of the first primary-side winding, the other end of the first capacitor is connected to the dotted terminal of the second primary-side winding, and a gate of the second switch transistor is connected to a secondary-side control signal.

12. The flyback switching power supply according to claim 11, wherein the secondary-side control signal is a PWM signal controlled by a voltage between the positive output and the negative output.

13. The flyback switching power supply according to claim 11, wherein a duty cycle of the primary-side control signal is fixed.

14. The flyback switching power supply according to claim 11, wherein a duty cycle of the primary-side control signal is provided according to m times of an actual output power of a secondary side, and the duty cycle does not increase until reaching a maximum duty cycle.

15. The flyback switching power supply according to claim 11, wherein directions of physical paths of excitation currents of the first primary-side winding and the second primary-side winding during PCB wiring are opposite.

16. A flyback switching power supply comprising: a transformer, a first switch transistor, a second switch transistor, a second capacitor, and a first diode, wherein the first switch transistor is a P-channel field-effect transistor and the second switch transistor is an N-channel field-effect transistor, the transformer comprises a first primary-side winding, a second primary-side winding, and a secondary-side winding, an undotted terminal of the secondary-side winding is connected to a drain of the second switch transistor, a source of the second switch transistor is connected to one end of the second capacitor to form a positive output, and a dotted terminal of the secondary-side winding is connected to the other end of the second capacitor to form a negative output; a negative terminal of an input DC power supply is connected to both a drain of the first switch transistor and the dotted terminal of the second primary-side winding, and a source of the first switch transistor is connected to an undotted terminal of the first primary-side winding; the undotted terminal of the second primary-side winding is connected to an anode of the first diode, a dotted terminal of the first primary-side winding is connected to a cathode of the first diode, and a connection point is also connected to a positive terminal of the input DC power supply; a gate of the first switch transistor is connected to a primary-side control signal; wherein the first primary-side winding and the second primary-side winding are bifilar-wound, the flyback switching power supply further comprises a first capacitor, one end of the first capacitor is connected to the undotted terminal of the first primary-side winding, the other end of the first capacitor is connected to the undotted terminal of the second primary-side winding, and a gate of the second switch transistor is connected to a secondary-side control signal.

17. The flyback switching power supply according to claim 16, wherein the secondary-side control signal is a PWM signal controlled by a voltage between the positive output and the negative output.

18. The flyback switching power supply according to claim 16, wherein a duty cycle of the primary-side control signal is fixed.

19. The flyback switching power supply according to claim 16, wherein a duty cycle of the primary-side control signal is provided according to m times of an actual output power of a secondary side, and the duty cycle does not increase until reaching a maximum duty cycle.

20. The flyback switching power supply according to claim 16, wherein directions of physical paths of excitation currents of the first primary-side winding and the second primary-side winding during PCB wiring are opposite.

* * * * *